(12) United States Patent
Mutagi et al.

(10) Patent No.: US 10,249,296 B1
(45) Date of Patent: Apr. 2, 2019

(54) APPLICATION DISCOVERY AND SELECTION IN LANGUAGE-BASED SYSTEMS

(71) Applicant: Amazon Technologies, Inc., Seattle, WA (US)

(72) Inventors: Rohan Mutagi, Redmond, WA (US); Peter Paul Henri Carbon, Bellevue, WA (US); Fred Torok, Seattle, WA (US); Vikram Kumar Gundeti, Seattle, WA (US); Frederic Johan Georges Deramat, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 40 days.

(21) Appl. No.: 14/288,178

(22) Filed: May 27, 2014

(51) Int. Cl.
*G10L 21/00* (2013.01)
*G10L 25/00* (2013.01)
*G10L 15/18* (2013.01)

(52) U.S. Cl.
CPC .................... *G10L 15/1822* (2013.01)

(58) Field of Classification Search
CPC ... G10L 15/22; G10L 15/26; G10L 2015/223; G10L 15/18; G10L 17/22; G10L 15/1822; G10L 2015/225; G06F 3/167; G06F 17/277; G06F 17/27; G06F 17/2785; G06F 17/30654
USPC .......................................... 704/235, 270–275
See application file for complete search history.

(56) References Cited

U.S. PATENT DOCUMENTS

| | | | | |
|---|---|---|---|---|
| 5,632,002 A | * | 5/1997 | Hashimoto | G06F 3/165 704/231 |
| 5,897,618 A | * | 4/1999 | Loats | G10L 15/26 704/270 |
| 6,405,170 B1 | * | 6/2002 | Phillips | G10L 15/22 379/88.02 |
| 6,615,177 B1 | * | 9/2003 | Rapp | G10L 15/26 704/270 |
| 7,418,392 B1 | | 8/2008 | Mozer et al. | |
| 7,720,683 B1 | | 5/2010 | Vermeulen et al. | |
| 7,774,204 B2 | | 8/2010 | Mozer et al. | |
| 7,818,671 B2 | * | 10/2010 | de Souza | G09B 21/007 715/709 |

(Continued)

FOREIGN PATENT DOCUMENTS

WO WO2011088053 A2 7/2011

OTHER PUBLICATIONS

Pinhanez, "The Everywhere Displays Projector: A Device to Create Ubiquitous Graphical Interfaces", IBM Thomas Watson Research Center, Ubicomp 2001, Sep. 30-Oct. 2, 2001, 18 pages.

*Primary Examiner* — Olujimi A Adesanya
(74) *Attorney, Agent, or Firm* — Lee & Hayes, P.C.

(57) ABSTRACT

A language-based system may be configured to interact with a user by understanding natural language of the user and may provide functions and services in response to such natural language. Certain functions and services may be provided by third-party applications that register serviceable intents with the language-based system. A serviceable intent indicates an intent that the third-party application is able to fulfill or service. Upon determining an intent of the user based on natural language interaction with the user, the system identifies one of the third-party applications that has specified a matching serviceable intent and selects that application for use by the user.

25 Claims, 4 Drawing Sheets

(56) References Cited

U.S. PATENT DOCUMENTS

| | | | | |
|---|---|---|---|---|
| 8,239,206 | B1* | 8/2012 | LeBeau | H04M 1/271 704/251 |
| 9,383,827 | B1* | 7/2016 | Faaborg | G06F 3/023 |
| 2004/0054539 | A1* | 3/2004 | Simpson | G10L 15/30 704/270.1 |
| 2004/0260438 | A1* | 12/2004 | Chernetsky | G10L 15/22 701/36 |
| 2007/0088556 | A1* | 4/2007 | Andrew | G10L 15/19 704/270.1 |
| 2008/0290987 | A1* | 11/2008 | Li | G06Q 30/02 340/5.1 |
| 2009/0030698 | A1* | 1/2009 | Cerra | G10L 15/30 704/275 |
| 2010/0138779 | A1* | 6/2010 | Portele | G06F 9/451 715/802 |
| 2010/0312547 | A1* | 12/2010 | Van Os | G06F 3/167 704/9 |
| 2011/0010180 | A1* | 1/2011 | Agapi | G06F 17/30861 704/275 |
| 2011/0295852 | A1* | 12/2011 | Wang | G06F 17/30867 707/728 |
| 2012/0223885 | A1 | 9/2012 | Perez | |
| 2013/0311997 | A1* | 11/2013 | Gruber | G06Q 10/10 718/102 |
| 2013/0332172 | A1* | 12/2013 | Prakash | H04M 1/6075 704/270.1 |
| 2014/0095167 | A1* | 4/2014 | Lynch | G10L 15/22 704/270.1 |
| 2014/0277843 | A1* | 9/2014 | Langlois | H04M 1/6091 701/2 |
| 2015/0088523 | A1* | 3/2015 | Schuster | G10L 15/22 704/275 |

\* cited by examiner

APPLICATION DISCOVERY AND SELECTION IN LANGUAGE-BASED SYSTEMS

BACKGROUND

Homes and other user premises are increasingly equipped with always-on Internet or "cloud" connectivity. In many cases, even mobile users have constant or nearly constant data connectivity. The common availability of network communications, in combination with increasing capabilities of computing devices, has created a number of new possibilities for services and other functionality that use the variety of connected devices accessible to users. Language-based and speech-based systems are examples of technologies that may be used to provide conveniences to users as they interact with automated systems.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
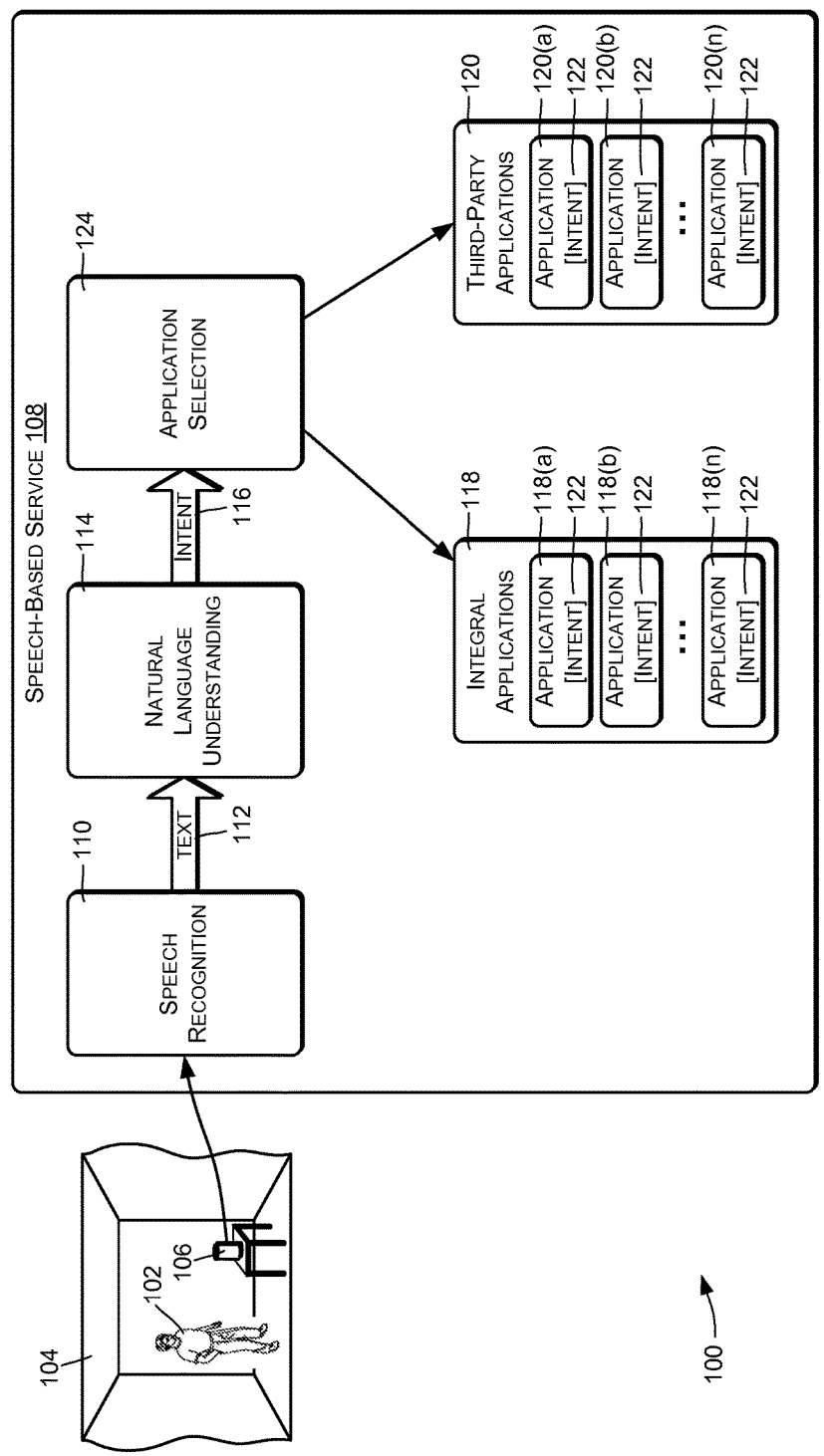
FIG. 1 is a block diagram illustrating a speech-based system that users different applications based on intents derived from user speech.

This disclosure describes devices, systems, and services that perform natural language and/or speech-based interactions with users. In described embodiments, a system listens to or interacts with a user to determine a user intent based on natural language understanding of the user's speech. For example, a user may utter an expression that is understood as an intent to play a song or to order movie tickets. In certain embodiments, the system may conduct natural language dialogs with the user to determine or clarify user intents. Upon determining the intent of the user, the system acts upon the intent by performing an action or providing a service in fulfillment of the intent, such as by playing the song or interacting further with the user to order movie tickets.

Certain intents may be actionable by integrated capabilities of the system itself integrated capabilities of the system may include things such as playing music, setting alarms, providing current weather and news, and so forth. In addition to its integrated capabilities, the system may allow the user to obtain, activate, and/or purchase third-party, speech-enabled applications that provide extended capabilities. Third-party applications are applications that have been developed by third-party entities other than the entity that is responsible for the system itself.

Third-party applications may register with the system using APIs (application programming interfaces) of the system. Each third-party application may also specify one or more serviceable intents that can be serviced or satisfied by the third-party application. For example, a third-party application may declare that it is capable of responding to the serviceable intent "obtain gas prices."

Upon interacting with a user and determining a user intent, the system may attempt to fulfil the intent using integrated capabilities. However, the system may also identify and use third-party applications that have registered to service the determined user intent. For example, the system may select a third-party application that has specified a serviceable intent matching the determined user intent.

The system may maintain a listing or online storefront that advertises available third-party applications from which the user may select. The user may utilize the speech capabilities of the system to discover appropriate applications. When searching for an application, the user may use natural language to specify a desired intent, and the system may respond by enumerating the various third-party applications that are capable of responding to the intent. Alternatively, the user may discover new applications by simply expressing an intent that is suitable for handling by a third-party application. In response to detecting such an intent, the system may identify the application to the user and suggest that the user purchase and use the application. After obtaining or activating the application, the user may use the application either by expressing an intent that the application is capable of handling or by explicitly stating a desire to use the application.

FIG. 1 illustrates an example configuration of a speech-based system 100 that responds to natural language expressed in user speech by initiating different applications in accordance with intents that are understood from the natural language. The system 100 includes different classes or types of applications, some of which are automatically enabled and used in response to user speech and others of which are used only after receiving explicit user instructions to do so.

A user 102 is pictured in a room or other user premises 104. User premises may include houses, offices, automobiles, and other spaces or areas. One or more speech interface devices 106 are positioned within the user premises 104. A speech interface device 106 may in some embodiments comprise a network-based or network-accessible device having a microphone, a speaker, and a network or other communications interface.

The speech-based system 100 includes a speech-based service 108 that receives real-time audio or speech information from the speech interface device 106 in order to detect user utterances, to determine user intent based on the utterances, and to perform actions or provide services in fulfillment of the user intent. The speech-based service 108 may also generate and provide speech and other audio for playback by the device 106. In some cases, the speech-based service 108 may conduct speech dialogs with the user 102 using the microphone and speaker capabilities of the device 106. A speech dialog may comprise an alternating sequence of user utterances and system speech responses.

The speech-based service 108 may in some embodiments be implemented as a network-based or cloud-based service. Communications between the device 106 and the service 108 may be implemented through various types of data communications networks, including local-area networks, wide-area networks, and/or the public Internet. Cellular and/or other wireless data communications technologies may also be used for communications. The speech-based service 108 may serve a large number of speech interface devices 106, which may be located in the premises of many different users.

The speech-based service 108 is configured to interact with the user 102 through the speech interface device 106 to determine a user intent and to provide a function or service in response to or in fulfillment of the user intent. Provided services may include performing actions or activities, rendering media, obtaining and/or providing information, providing information via generated or synthesized speech via the speech interface device 106, initiating Internet-based services on behalf of the user 102, and so forth.

As an example, the user 102 may utter an initial query, such as "I want to buy movie tickets." The service 108 may respond by asking a clarifying question such as "Which movie?" The user might then respond by stating the name of a movie, and the system may then ask "What time would you like to attend the movie?" A dialog such as this might be continued until the service 108 has identified requisite intent components or entities, such as "Purchase three tickets for the movie 'Gone With the Wind' showing at the River Center Theater at 2:30 pm Sunday." The service 108 may then purchase the specified tickets on behalf of the user 102.

In addition to acting as a speech interface, the device 106 may provide other types of capabilities and functionality for the benefit of the user 102. For example, the speech interface device 106 may act as a media device for playing music, video, or other content within the user premises 104. In some cases, the device 106 may be configured to receive and present media or other data from third-party services such as music services, video services, data services, social media services, email services, and other information sources or providers.

In operation, the user 102 utters a command or natural language expression. The speech interface device 106 receives the user utterance and provides audio containing the speech of the user 102 to the speech-based service 108. More specifically, the audio is provided to an automated speech recognition (ASR) component 110 of the speech-based service 108. The ASR component 110 performs speech recognition to produce a text string 112 containing the natural language spoken by the user 102. The text string 112 is provided to a natural language understanding (NLU) component 114 that uses natural language understanding techniques to determine an intent 116 expressed by the words of the text string 112.

The speech-based service 108 includes or has access to multiple applications for servicing different user intents. The applications may include integral, native applications 118 and non-native, third-party applications 120. The applications 118 and 120 may perform different functions or provide different services relating to different activity or content domains. For example, one application might relate to the music domain and might have functionality for finding and playing music. Another application might correspond to a notification domain and might have functionality for setting and issuing alerts or alarms. The applications may be speech-enabled, meaning that they are configured to interact with users through speech to provide desired functionality.

The integral applications 118 may include multiple integral applications 118(*a*) through 118(*n*), each of which may be capable of performing one or more functions or actions. The third-party applications 120 may include multiple third-party applications or functions 120(*a*) through 120(*n*), each of which may be capable of performing one or more functions or actions. Each of the applications 118 and 120 may correspond to one or more serviceable intents 122 that the application is capable of satisfying or servicing. The serviceable intent 122 of an application is the intent that the application is able to service or to which the application is able to respond. The serviceable intent may be specified in terms of parameters, natural language, and/or natural language models.

The integral applications 118 implement functionality that is provided as integral, default, and/or automatically invoked capabilities of the speech-based service 108. The third-party applications 120 include additional functionality and capabilities that are provided by third-party developers and/or as applications that may be selectively purchased or enabled by the user 102. After being enabled, the third-party applications 120 may be used similarly to the integral applications 118. That is, enabled or authorized third-party applications 120 may be automatically invoked in response to user intents that correspond to the serviceable intents of the third-party applications 120.

The third-party applications 120 may be designed and provided by various venders and/or providers to work in conjunction with the speech interface device 106 and/or to provide services using the speech-based service 108 in combination with the speech interface device 106. The third-party applications 120 may provide functionality ranging from email to games. The third-party applications 120 may base their services in part on speech-related information that is provided by the speech interface device 106 and the speech-based service 108, including recognized text of speech, user intents derived from recognized speech, and commands that have been interpreted from user speech. In addition, the third-party applications 120 may provide speech that is to be rendered on the speech interface device 106, and may provide other instructions and commands to the speech interface device 106 through the speech-based service 108.

Approved third-party applications 120 may be listed or made available in an online store or marketplace for selection, purchase, and/or activation by users. The online store may list many third-party applications that the user is not yet authorized to use or that the user has not yet enabled. The user may browse or peruse available applications, using a graphical interface or a speech-based interface, to select one of the applications, to purchase the application, and to activate, enable, and/or install the application.

Although the third-party applications are illustrated as being part of the speech-based service 108, the applications 120 may be implemented physically apart from the speech-based service 108, such as by different services or servers, and may work in conjunction with the speech-based service 108 through network-based application programming interfaces.

The third-party applications may be individually enabled or disabled on a per-user basis. By default, the third-party applications may be initially disabled. Purchasing, enabling, or activating one of the third-party applications may result in authorization for the user 102 to access or use the application. Thus, the third-party applications that are activated and immediately available to the user 102 may comprise a subset of a larger library of third-party applications, wherein the user is authorized to use the subset of applications based on some criteria such as explicit selection, authorization, and/or payment.

The speech-based service 108 may include an application selection module or component 124 that selects and invokes one of the applications 118 or 120 based on the user intent 116. More specifically, the application selection component 124 receives the user intent 116 and in response identifies one of the applications 118 or 120 whose serviceable intent 122 matches or corresponds to the user intent 116. The application selection module 124 may be configured to first attempt to identify one of the integral applications 118 whose serviceable intent 122 matches the user intent 116. If such an integral application 118 exists it is invoked in response to the user intent 116. Otherwise, the application selection module 124 may identify one of more of the third-party applications 120 having an intent 122 that matches the user intent 116. Upon identifying one or more of such third-party applications 120, those third-party applications are identified to the user and the user is asked whether he or she wants to purchase and/or enable one of the identified third-party applications. For example, the speech-based service might send a message or prompt such as "Would you like to purchase the XYZ taxi-cab service for handling this request?" in response to the user command "Call a taxi."

If the user indicates that he or she wants to enable a third-party application, the third-party application is installed or enabled. Once enabled, future user requests expressing the same user intent are automatically serviced by the enabled third-party application 120, without further prompting regarding whether the user wants to use the application. That is, the third-party application 120 will be used automatically in response to further requests by the user that indicate a matching user intent.

Figure 2:
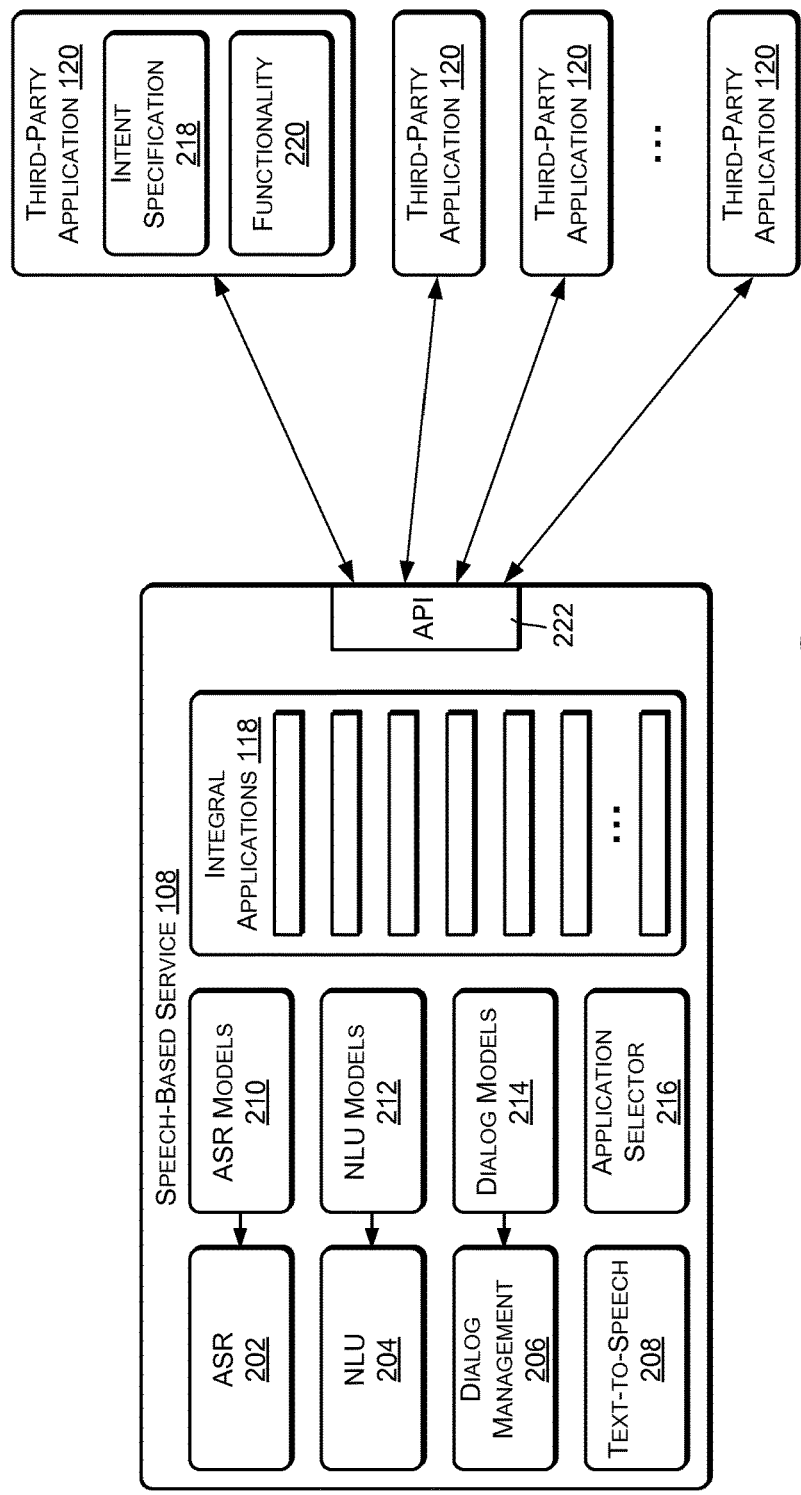
FIG. 2 is a block diagram illustrating relevant components of a speech-based service and associated third-party applications that may be invoked by the speech-based service.

FIG. 2 illustrates further details regarding the example speech-based service 108. The speech-based service 108 may have various components for understanding user speech and for determining user intent. For example, the service 108 may have an automated speech recognition (ASR) component 202 that receives audio containing user utterances from the speech interface device 106 and that recognizes user speech in the audio or utterances. The speech recognition component 202 may provide a textual representation of the recognized user speech, for example.

The speech-based service 108 may also have a natural language understanding component 204 that receives recognized speech from the speech recognition component 202 and that analyzes the speech to determine meaning or intent of the speech.

The speech-based service 108 may also have a dialog management component 206 configured to coordinate dialogs or interactions with the user 102 based on speech as recognized by the speech recognition component 202 and/or understood by the natural language understanding component 204. The service 108 may also have a text-to-speech component 208 that is responsive to the dialog management component 206 to generate speech for playback to the user 102 on the speech interface device 106.

The components described above may function based on different types of models or rules. For example, the speech recognition component 202 may base its functionality on automated speech recognition (ASR) models 210, which may include acoustic models created by means of various training techniques. Similarly, the natural language understanding component 204 may utilize natural language understanding (NLU) models 212 that specify grammar, lexicons, phrases, responses, and so forth, and which also may be created by training. The dialog management component 206 may utilize dialog models 214 that specify logic for conducting dialogs with users. A dialog comprises an alternating sequence of natural language statements or utterances by the user 102 and system generated speech or textual responses. The dialog models 214 embody logic for creating responses based on received user statements in order to prompt the user 102 for more detailed information regarding intents or to obtain other information from the user 102.

The speech-based service 108 may have an application selector 216 that identifies, selects, and/or invokes integral applications 118 or third-party applications 120 in response to user intents identified by the natural language understanding module 204. In response to a determined user intent, the application selector 216 attempts to identify one of the integral applications 118 that is capable of servicing the user intent. If such an integral application 118 is found, it is called or invoked to either satisfy the user intent or to conduct further dialog with the user to further refine the user intent. If an integral application 118 corresponding to the user intent is not found, the application selector 216 attempts to identify one or more third-party applications 120 having serviceable intents that correspond to the determined user intent. If an identified one of the third-party applications 120 has already been enabled by the user, it is invoked to service the user intent. Otherwise, the user may be prompted to purchase and/or enable one of the identified third-party applications 120. After the user purchases and/or enables a third-party application 120 that is capable of servicing the intent expressed by the user, the third-party application 120 is invoked to service the current user command and henceforth is automatically invoked when the user expresses the same type of intent.

Each third-party application 120 may have or provide an intent specification 218 that defines the intent that is serviceable by the application 120. The intent indicated by the intent specification 218 may be referred to herein as an application intent or as the serviceable intent of the application 120. The third-party application also has functionality 220 that is specific to the individual application. Although only one of the third-party applications 120 is illustrated as having an intent specification 218 and functionality 220, each of the third-party applications may have such an intent specification 218 and functionality 220.

The intent specification 218 of a third-party application 120 defines a general intent or intent type that can be serviced by the application 120. The speech-based service 108 uses the intent specification 218 to detect user utterances or expressions that correspond to the serviceable intent of the third-party application 120.

The intent specification 218 may include NLU models for use by the natural language understanding component 204 in conjunction with the NLU models 212. In some cases, the NLU models 212 may include or incorporate the NLU models specified by the third-party applications 120.

The third-party application 120 may also have or specify dialog models that create and coordinate speech interactions with the user 102. The dialog models may be used by the dialog management component 206 in conjunction with the dialog models 214 to create and coordinate dialogs with the user 102 and to determine user intent either before or during operation of the third-party application 120. In some cases, the dialog models 214 may include or incorporate the dialog models specified by the third-party applications 120.

The speech-based service 108 may have or expose an application programming interface 222 and each of the third-party application 120 may be registered through the API 222 with the speech-based service. The registration of a particular third-party application 120 may indicate or provide the intent specification 218 for use by the speech-based service 108. Third-party developers may provide registrations of their applications through the API 222 so that the applications 120 may be used in conjunction with the speech-based service 108.

The NLU component 204 and the dialog management component 206 may in some embodiments be configured to use the intent specifications of the third-party applications 120 to conduct dialogs, to identify expressed intents of users, and to identify third-party applications 120 that correspond to or are capable of servicing intents expressed by users.

The intent specification 218 of an application 120 may be utilized either before or during operation of the third-party application 120. In some cases, for example, the dialog management component 206 may utilize the intent specification 218 when determining a general user intent, prior to initiating or invoking the third-party application 120. More specifically, the NLU component 204 and dialog management component 206 may use the intent specification 218 in conjunction with the NLU models 212 and dialog models 214 to determine when a user has expressed an intent that can be serviced by the third-party application 120. Subsequently, the NLU component 204 and dialog management component 206 may use the intent specification 218 to conduct further dialogs with the user 102 in order to further refine the user intent. Alternatively, the third-party application 120 may conduct further dialogs with the user 102, utilizing capabilities of the speech-based service 108, to refine user intent in order to provide the functionality 220.

As an example, in response to a user utterance the speech-based service 108 may refer to the intent specifications 218 of multiple third-party applications 120 to identify a "purchase tickets" intent that has been registered as a serviceable intent by one of the third-party applications 120. The service 108 may then invoke the corresponding third-party application 120. Upon being invoked, the third-party application 120 may receive an indication of the determined intent and may conduct or coordinate further dialogs with the user 102 in order to elicit further intent details. Upon determining sufficient details regarding the user intent, the application 120 may perform its functionality 220 in fulfillment of the intent.

When conducting dialogs with the user 102, the third-party application 120 may utilize speech-related capabilities of the service 108 such as the ASR component 202, the NLU component 204, the dialog management component 206, and the text-to-speech component 208.

As another example, a user may state an intent that is not serviceable by any applications that are currently available to the user. For example, the user may state "I want to a call a taxi." Although neither the integral applications nor the third-party applications that the user has currently activated are capable of servicing such an intent, the speech-based service 108 may search a listing or marketplace of third-party applications to identify one that has specified a matching or corresponding serviceable intent. In some cases, the service 108 may then automatically invoke or initiate the identified third-party application. In other cases, the service may prompt the user to purchase or activate the application and subsequently launch or invoke the application.

When an application has been initiated, further speech interactions with the user may be performed under the control of the initiated application, which may interpret user statements in accordance with the activity domain of the application using NLU models that are particular to the application and its domain. For example, the application may conduct dialogs with the user in accordance with the functions that the application is designed to perform. Upon detecting a user statement or intent that is not consistent with the activity domain of the application, the application may terminate itself and control may return to the service 108. In some cases, the service 108 may continue to monitor user statements during execution of the third-party application and may preempt the application upon detecting an expression or intent by the user that is not consistent with the activity domain of the application. The speech-based service 108 may oversee the routing of user utterances or intents, and may utilize different components or applications to service new utterances or intents current context and other information.

In some cases, an indication may be provided to the user that he or she is communicating with a third-party application rather than with integral applications of the service 108. As an example, the text-to-speech component 208 may be configured to user a different voice when generating speech under the control of a third-party application.

A user may also discover applications by explicit request, such as by asking for an identification of third-party applications that are suitable for servicing a stated intent. For example, the user may state "Show me applications for calling taxis." In response, the service 108 may enumerate one or more third-party applications that have registered the serviceable intent "call taxi."

Note that although certain techniques have been described in a speech-based context, user input and dialogs may be provided or conducted in ways other than speech, such as textually. For example, a user may specify intents by typing natural language statements using a keyboard, and a service may respond by displaying responsive text. Dialogs may be conducted using such two-way textual exchanges. In addition, an architecture similar to that shown in FIGS. 1 and 2 may be used other environments or configurations. For example, the described components and techniques may be implemented entirely within a computing device such as a personal computer, a smartphone, a tablet computer, or any other type of device.

The API 222 may be used to provide communications between the service 108 and the third-party applications 120. Various capabilities of the service 108 may be made available to the third-party applications 120 through the API 222 such as speech recognition, natural language understanding, dialog management, speech generation, and so forth. A third-party application 120 may use these service-provided capabilities or may implement similar capabilities on its own.

The API 222 may be configured to interact with the speech interface device 106 and/or the third-party applications 120 according to a web services model, and certain functionality of the speech-based services may be exposed or implemented as one or more web services. Generally, a web service may comprise any type of computing service that is made available to a requesting client via a request interface that includes one or more Internet-based application layer data transport protocols, such as a version of the Hypertext Transport Protocol (HTTP) or another suitable protocol. Interfaces with the device 106 and/or the third-party applications 120 may be implemented as web services endpoints, having Uniform Resource Locators (URLs), e.g., http://storageservice.domain.com.

Web services may be implemented in a variety of architectural styles, using a variety of enabling service protocols. For example, in a Representational State Transfer (REST)-style web services architecture, the parameters that are pertinent to a web services call (e.g., specifying the type of service requested, user credentials, user data to be operated on, etc.) may be specified as parameters to the data transport command that invokes the web services call to the web services endpoint, such as an HTTP GET or PUT command. In some implementations, REST-style web services architectures are stateless, in that each web services call may contain all the information necessary to process that call without reference to external state information. In contrast to REST-style web services architectures, document-based or message-based web services architectures may encode the parameters and data pertinent to a web services call as a document that may be transmitted to a web services endpoint and then decoded and acted upon by the endpoint. For example, a version of eXtensible Markup Language (XML) or another suitable markup language may be used to format the web services request document. In some embodiments, the markup language used to format the request document may delimit parameters that control the processing of the request, while in other embodiments certain features of the markup language itself (e.g., certain tags) may directly control aspects of request processing. Additionally, in some embodiments the resulting document may be encapsulated within another protocol, such as a version of the Simple Object Access Protocol (SOAP), for example, in order to facilitate processing of the web services request by the endpoint.

Other protocols may also be employed within various embodiments of web services architectures. For example, a version of Web Services Description Language (WSDL) may be employed by a web services endpoint to publish its interfacing requirements to potential clients. Web services endpoints may make themselves known to potential clients through a directory protocol such as a version of the Universal Description, Discovery and Integration (UDDI) protocol. Numerous other types of protocols relating to the provision of computing services via web services interfaces may exist, and any given web services implementation may use any suitable combination of such protocols.

Figure 3:
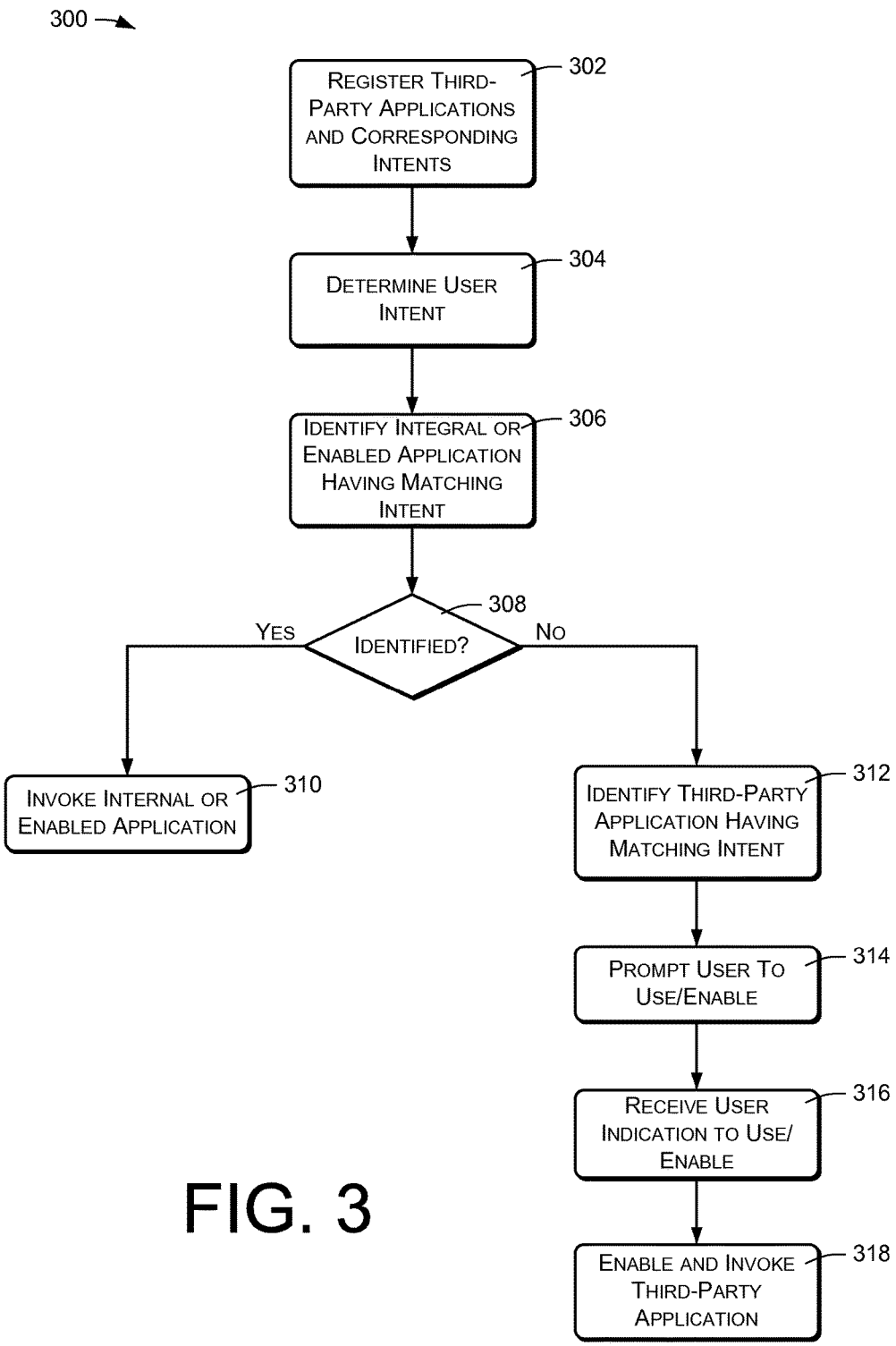
FIG. 3 is a flow diagram showing an example method for selecting and using speech-enabled applications by a speech-based service.

FIG. 3 illustrates an example method 300 of providing, selecting, activating, and/or using applications, including third-party applications, in conjunction with a speech-based or language-based system. The actions of FIG. 3 may be performed by such a speech-based or language-based system.

An action 302 comprises registering or receiving registrations of multiple third-party applications. The third-party applications may register through an API of a network-based or cloud-based service. The registration for each application may specify a corresponding serviceable intent that can be satisfied or serviced by the third-party application. Each serviceable intent may be indicated by an intent specification that defines the serviceable intent. For example, the intent specification may specify acoustic models, language models, dialog models, and other information that may be used by the language-based system to interact with users through natural language and/or speech.

An action 304 comprises determining a user intent. This may be accomplished by interacting with the user through natural language, including textual and/or spoken natural language. The action 304 may comprise receiving user speech or user utterances that indicate or express an intent. In some embodiments, the action 304 may include conducting a natural language dialog with the user, wherein each natural language dialog comprises an alternating sequence of user speech and responses generated by the language-based system. Automatic speech recognition and natural language understanding may be performed on received user speech or utterances to determine user intents. The intent specifications provided by third-party applications may be used in conjunction with internal models of the system when determining user intent.

Figure 4:
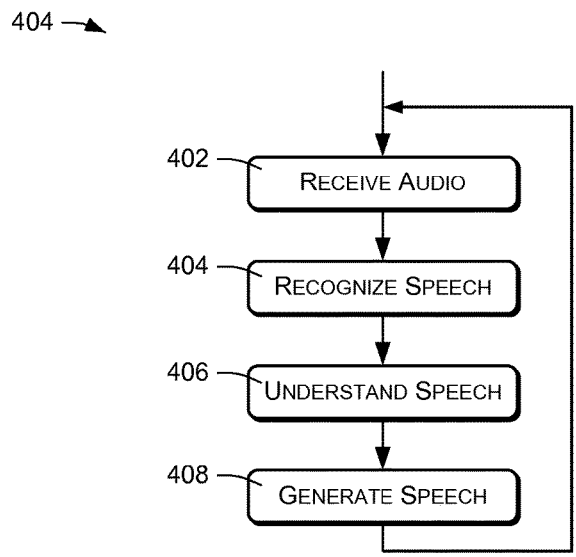
FIG. 4 is a block diagram showing an example method of conducting a speech dialog, such as may be used in the method of FIG. 3.

FIG. 4 illustrates an example implementation of the action 304 of determining user intent, which in this case comprises performing or conducting a natural language dialog with a user. When conducting a dialog, an action 402 may comprise receiving audio from a microphone or speech interface device. The audio may contain speech in the form of one or more user utterances, which may in turn comprise or contain spoken natural language from the user. An action 404 may comprise recognizing speech in the audio, which may comprise performing automatic speech recognition on the user utterance. An action 406 may comprise understanding the meaning of the speech, which may comprise performing natural language understanding on the user utterance. In response to the understood meaning of the speech, an action 408 may comprise generating responsive speech that is played to a user with a speaker or with the speech interface device. A dialog may include one or more iterations of the actions shown in FIG. 4, which may be conducted to obtain successively greater detail regarding user intent.

Returning to FIG. 3, an action 306 may comprise, in response to determining the user intent, identifying or attempting to identify an integral or previously enabled third-party application whose serviceable intent corresponds to the determined user intent. An action 308 comprises determining whether such an application has been identified.

An action 310 is performed upon identifying an integral or previously enabled third-party application having a serviceable intent that corresponds to the determined user intent. The action 310 comprises invoking the identified application and/or causing the identified application to perform an action corresponding to the user intent. The action 310 is performed automatically, without requesting input from the user regarding whether to user the identified application.

Actions 312, 314, 316, and 318 are performed when an integral or enabled third-party application having a serviceable intent that corresponds to the user intent is not found. The action 312 comprises identifying or attempting to identify a third-party application whose serviceable intent corresponds to the determined user intent. The action 314 comprises prompting or sending a message to the user that such an identified application is available to act on the determined user intent. The action 316 comprises receiving an indication or authorization from the user to use and/or enable the identified application. The action 318, in response to receiving the indication from the user to enable or use the identified application, comprises causing the identified application to perform an action corresponding to the determined user intent.

In some embodiments, the actions 312, 314, and 316 may be omitted, and the action 318 of enabling and/or invoking a third-party application may be performed automatically. That is, upon determining that there is no internal or previously enabled third-party application corresponding to a received intent, a third-party application may be identified and automatically invoked without prompting the user.

In some embodiments, the actions 312, 314, 316, and 318 may be performed even when there is an internal or previously enabled third-party application capable of servicing or responding to the determined user intent. For example, the system may in some cases alert the user to additional third-party applications that may be suitable for responding to the determined user intent, and/or third-party applications that may be better suited to responding to the user intent than any internal or currently enabled third-party applications. As another example, the system may in some cases alert the user to third-party applications that have recently become available for servicing the determined user intent, despite the existence of internal or previously enabled third-party applications that are also capable of responding to the determined user intent. In some cases, recommendations such as this may be made after performing the action 310 of automatically invoking an application. In other cases, recommendations may be made prior to invoking any application, and the user may be given the opportunity to select an alternative application other than the application might have otherwise serviced the intent by default.

In some cases, the system may suggest or recommend third-party applications based on known characteristics of the user, various information known about the user, histories of user activities and preferences, habits and activities of users who are similar to the present user, and so forth. In response to a given intent expressed by the user, for example, the system may determine which applications are preferentially used by other users who are similar to the present user. The system may then suggest or recommend applications such as this that are capable of responding to the intent expressed by the current user. Similarly, the system may select applications based on past purchase histories or application usage histories of the user.

In some cases, the system may ask the user whether to use a selected application for all similar user requests, or whether the user should be prompted anew each time the user makes a similar request.

These behaviors may be enabled or disabled in accordance with user supplied settings or configurations.

In some cases, the action 314 may comprise identifying the application to the user and prompting the user to purchase or activate the application for future use.

Figure 5:
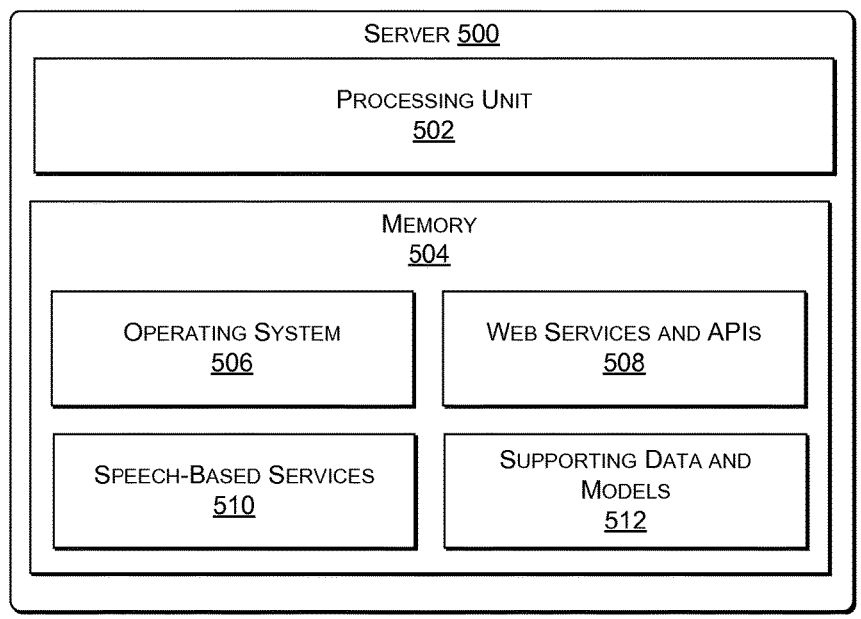
FIG. 5 is a block diagram illustrating components of a server device that may be used in part to implement the speech-based service and speech-enabled applications described herein.

FIG. 5 illustrates relevant components of a server 500 that may be used to implement the functionality of the speech-based service 108, the third-party applications 120, and/or other components that may be used to provide services and implement techniques as described herein. Generally, functional components of the service 108 may be implemented by one or more servers, with the various functionality described above distributed in various ways across the different servers. Servers may be located together or separately, and organized as virtual servers, server banks, and/or server farms. The described functionality may be provided by the servers of a single entity or enterprise, or may utilize the servers and/or services of multiple entities or enterprises.

In a very basic configuration, an example server 500 may comprise a processing unit 502 and associated memory 504. Depending on the configuration of the server 500, the memory 504 may be a type of computer storage media and may include volatile and nonvolatile memory. Thus, the memory 504 may include, but is not limited to, RAM, ROM, EEPROM, flash memory, or other memory technology. The processing unit 502 may be composed of one or more processors, which may include one or more digital signal processors.

The memory 504 may be used to store any number of functional components that are executable by the processing unit 502. In many embodiments, these functional components comprise instructions or programs that are executable by the processing unit 502, and that when executed implement operational logic for performing the actions described above.

Functional components stored in the memory 504 may include an operating system 506 as well as web services and APIs 508 that interact with remote or external entities such as computers, media consumption devices, speech interface devices, remote or third-party applications, and so forth. The memory 504 may also have instructions for implementing speech-related services 510, which may include the automated speech recognition component 202, the natural language understanding component 204, the dialog management component 206, the text-to-speech component 208, and so forth. The memory 504 may also contain supporting data and models 512 such as the ASR models 210, the NLU models 212, and the dialog models 214. The supporting data and models 512 may also contain registrations of the third-party applications 120 as well as the intent specifications provided by the third-party applications 120.

The server 500 may of course include many other logical, programmatic, and physical components that are not shown in FIG. 5.

Although the subject matter has been described in language specific to structural features, it is to be understood that the subject matter defined in the appended claims is not necessarily limited to the specific features described. Rather, the specific features are disclosed as illustrative forms of implementing the claims.

The invention claimed is:

1. A system comprising:
one or more processors; and
non-transitory computer-readable media storing instructions that, when executed by the one or more processors, cause the one or more processors to perform operations comprising:
determining a first serviceable intent associated with an application, wherein the first serviceable intent corresponds to a function to be performed by the application;
receiving first audio data associated with a user;
generating, via automatic speech recognition, first text data corresponding to the first audio data;
determining, via natural language understanding performed on the first text data, a first intent associated with the first audio data;
determining, based at least in part on the first intent, first response data related to the first audio data, the first response data including text that is to be output to the user;
causing the first response data to be output via a user device of the user, the first response data requesting second audio data from the user;
receiving, via the user device, the second audio data, the second audio data received in response to the first response data;
generating, via automatic speech recognition, second text data corresponding to the second audio data;
determining, via natural language understanding performed on the second text data, a second intent associated with the first audio data and the second audio data;
analyzing the second intent to determine whether the second intent corresponds to the first serviceable intent;
determining that the second intent corresponds to the first serviceable intent;
causing the application to perform the function associated with the serviceable intent;
receiving third audio data;
generating, via automatic speech recognition, third text data corresponding to the third audio data;

determining, via natural language understanding performed on the third text data, a third intent associated with the third audio data;
determining that the third intent corresponds to a second serviceable intent associated with an additional application; and
in response to determining that the third intent corresponds to the second serviceable intent, causing the application to cease performing the function.

2. The system of claim 1, wherein determining the first serviceable intent associated with the application comprises:
receiving, from a developer of the application, a registration of the application, the registration including an intent specification specifying at least one of an acoustic model, a language model, or a dialog model for use with the application; and
determining the first serviceable intent based at least in part on the registration.

3. The system of claim 1, wherein the function comprises a first function, the operations further comprising:
receiving fourth audio data associated with the user;
performing automatic speech recognition on the fourth audio data to generate fourth text data corresponding to the fourth audio data;
performing natural language understanding on the fourth text data to determine a fourth intent, wherein the serviceable intent corresponds to the fourth intent; and
causing the application to perform a second function corresponding to the fourth intent.

4. The system of claim 1, wherein the application interacts by speech with the user by conducting a speech dialog with the user.

5. A method, comprising:
determining a first serviceable intent associated with a first application, wherein the first serviceable intent corresponds to a first function to be performed by the first application;
receiving first audio data associated with a user;
generating, via automatic speech recognition performed on the first audio data, first text data corresponding to the first audio data;
determining, via natural language understanding performed on the first text data, a first intent associated with the first audio data;
determining, based at least in part on the first intent, first response data related to the first audio data, the first response data including text that is to be output to the user;
causing the first response data to be output via a user device of the user, the first response data requesting second audio data from the user;
receiving, via the user device, the second audio data, the second audio data received in response to the first response data;
generating, via automatic speech recognition, second text data corresponding to the second audio data;
determining, via natural language understanding performed on the second text data, a second intent associated with the first audio data and the second audio data;
determining that the second intent corresponds to the first serviceable intent;
causing the first application to perform the first function associated with the first serviceable intent;
receiving third audio data;
generating, via automatic speech recognition, third text data corresponding to the third audio data;
determining, via natural language understanding performed on the third text data, a third intent associated with the third audio data;
determining that the third intent corresponds to a second serviceable intent associated with a second application; and
in response to determining that the third intent corresponds to the second serviceable intent, causing the first application to cease performing the first function.

6. The method of claim 5, further comprising:
determining that the second intent corresponds to a third serviceable intent associated with a third application, wherein the third serviceable intent corresponds to a second function to be performed by the third application; and
prioritizing the first application over the third application based at least in part on information indicating that at least one of the user or other users utilize the first application more than the third application.

7. The method of claim 5, further comprising:
determining that the second intent corresponds to a third serviceable intent associated with a third application, wherein the third serviceable intent corresponds to a second function to be performed by the third application; and
prioritizing the first application over the third application based at least in part on the first application having been previously used by the user.

8. The method of claim 5, further comprising:
determining that the second intent corresponds to a third serviceable intent associated with a third application, wherein the third serviceable intent corresponds to a second function to be performed by the third application; and
prioritizing the third application over the first application based at least in part on the third application becoming available after the first application.

9. The method of claim 5, further comprising:
receiving fourth audio data associated with the user;
generating, via automatic speech recognition performed on the fourth audio data, fourth text data corresponding to the fourth audio data;
performing natural language understanding on the fourth text data to identify a fourth intent associated with the fourth audio data;
determining that the fourth intent corresponds to a third serviceable intent associated with the first application, wherein the third serviceable intent corresponds to a second function to be performed by the first application; and
causing the first application to perform the second function associated with the second serviceable intent.

10. The method of claim 5, and further comprising:
receiving fourth audio data associated with the user;
generating, via automatic speech recognition performed on the fourth audio data, fourth text data corresponding to the fourth audio data;
identifying, via natural language understanding performed on the fourth text data, a fourth intent associated with the fourth audio data; and
causing, based at least in part on the fourth intent, a second application to perform an additional action associated with the fourth audio data without requesting additional input from the user regarding whether to use the second application.

11. The method of claim 5, further comprising prompting the user to purchase or activate the first application.

12. The method of claim 5, further comprising conducting natural language dialogs with the user to receive the first audio data and the second audio data.

13. The method of claim 5, wherein
determining the first serviceable intent associated with the first application comprises:
receiving, from a developer of the first application, a registration of the first application, the registration including an intent specification specifying at least one of an acoustic model, a language model, or a dialog model for use with the first application; and
determining the first serviceable intent based at least in part on the registration.

14. The method of claim 13, wherein determining that the second intent corresponds to the first serviceable intent includes:
analyzing the intent specification specifying at least one of the acoustic model, the language model, or the dialog model to determine that the second intent corresponds to the first serviceable intent.

15. The method of claim 5, further comprising receiving registrations of multiple applications and corresponding intents, wherein the multiple applications comprise the first application.

16. The method of claim 5, wherein determining the first serviceable intent associated with the first application comprises:
receiving, from a developer of the first application, an intent specification specifying at least one of an acoustic model, a language model, or a dialog model for use with the first application; and
determining the first serviceable intent based at least in part on the intent specification.

17. The method of claim 5, further comprising:
determining that the second intent corresponds to a third serviceable intent associated with a third application, wherein the third serviceable intent corresponds to a second function to be performed by the third application;
prioritizing the first application over the third application based at least in part on the first application being registered after the third application; and
wherein causing the first application to perform the action is based at least in part on the first application being registered after the third application.

18. The method of claim 5, further comprising:
causing output of audio requesting input from the user on which action the user intends the first application to take;
receiving fourth audio data corresponding to the input from the user; and
causing the first application to perform the action based at least in part on the input from the user.

19. A method comprising:
determining a first serviceable intent associated with an application;
identifying a predefined operation associated with the first serviceable intent;
determining response data related to first audio data associated with a user, the response data including text that is to be output to the user, via a user device of the user, requesting second audio data from the user;
receiving, via the user device, the second audio data, the second audio data received in response to the response data;
determining a first intent associated with the first audio data and the second audio data;
determining that the first intent corresponds to a request to perform the predefined operation;
causing the application to perform the predefined operation based at least in part on determining that the first intent corresponds to the request to perform the predefined operation;
receiving third audio data;
determining a second intent associated with the third audio data;
determining that the second intent corresponds to a second serviceable intent associated with an additional application; and
in response to determining that the second intent corresponds to the second serviceable intent, causing the application to cease performing the predefined operation.

20. The method of claim 19 further comprising:
identifying a third intent expressed by the user; and
causing the application to respond to the third intent without requesting additional input from the user regarding whether to use the application.

21. The method of claim 19, further comprising prompting the user to purchase or activate the application.

22. The method of claim 19, further comprising conducting natural language dialogs with the user to identify the first intent.

23. The method of claim 19, further comprising receiving a registration of the application, wherein the registration specifies the predefined operation.

24. The method of claim 19, further comprising receiving registrations of multiple applications and corresponding predefined operations, wherein the multiple applications comprise the application.

25. The method of claim 19, further comprising performing automatic speech recognition and natural language understanding on at least one of the first audio data or the second audio data to determine the first intent.

* * * * *